United States Patent
Suk

(10) Patent No.: US 7,190,543 B2
(45) Date of Patent: Mar. 13, 2007

(54) METHOD AND APPARATUS FOR OPTIMIZING FLYING HEIGHT CONTROL USING HEATED SLIDERS

(75) Inventor: Mike Suk, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 11/048,009

(22) Filed: Jan. 31, 2005

(65) Prior Publication Data
US 2006/0171056 A1    Aug. 3, 2006

(51) Int. Cl.
*G11B 15/18* (2006.01)
(52) U.S. Cl. ...................................... 360/69
(58) Field of Classification Search ................ 360/69, 360/75, 77.02, 78.12, 235.1, 234.7, 126; 264/400
See application file for complete search history.

(56) References Cited

U.S. PATENT DOCUMENTS

| | | | |
|---|---|---|---|
| 5,959,801 A | 9/1999 | Gillis et al. | |
| 5,991,113 A * | 11/1999 | Meyer et al. | 360/75 |
| 6,307,719 B1 | 10/2001 | Mallary | |
| 6,493,183 B1 | 12/2002 | Kasiraj et al. | |
| 6,531,084 B1 * | 3/2003 | Strom et al. | 264/400 |
| 6,690,543 B2 | 2/2004 | Kurita et al. | |
| 6,760,182 B2 | 7/2004 | Bement et al. | |
| 2002/0024774 A1 | 2/2002 | Berger et al. | |
| 2002/0044371 A1 | 4/2002 | Bement et al. | |
| 2003/0035237 A1 * | 2/2003 | Lille | 360/77.07 |
| 2003/0099054 A1 * | 5/2003 | Kamijima | 360/59 |
| 2004/0027728 A1 * | 2/2004 | Coffey et al. | 360/313 |
| 2004/0075940 A1 | 4/2004 | Bajorek et al. | |
| 2004/0240109 A1 * | 12/2004 | Hamann et al. | 360/126 |
| 2005/0039325 A1 * | 2/2005 | Boutaghou et al. | 29/603.03 |

\* cited by examiner

*Primary Examiner*—Fred F. Tzeng
(74) *Attorney, Agent, or Firm*—David W. Lynch; Chambliss, Bahner & Stophel P.C.

(57) ABSTRACT

A method and apparatus for optimizing flying height control using heated sliders is disclosed. A first heater is provided in a slider for implementing a first operating characteristic and a second heater is provided in the slider for implementing a second operating characteristic. A power source is provided for activating the first and second heaters. An activation controller is provided for allowing the first and second heaters to be selectively activated by the power source.

21 Claims, 8 Drawing Sheets

METHOD AND APPARATUS FOR OPTIMIZING FLYING HEIGHT CONTROL USING HEATED SLIDERS

BACKGROUND OF THE INVENTION

1. Field of the Invention.

This invention relates in general to the operation of a magnetic storage device, and more particularly to method and apparatus for optimizing flying height control using heated sliders.

2. Description of Related Art.

Modem computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. In such devices, read-write heads are used to write data on or read data from an adjacently rotating hard or flexible disk.

A head/disk assembly typically includes one or more commonly driven magnetic data storage disks rotatable about a common spindle. At least one head actuator moves one or more magnetic read/write heads radially relative to the disks to provide for reading and/or writing of data on selected circular concentric tracks of the disks. Each magnetic head is suspended in close proximity to one of the recording disks and supported by an air bearing slider mounted to the flexible suspension. The suspension, in turn, is attached to a positioning actuator.

During normal operation, relative motion between the head and the recording medium is provided by the disk rotation as the actuator dynamically positions the head over a desired track.

The relative motion provides airflow along the surface of the slider facing the medium, creating a lifting force. The lifting force is counterbalanced by a known suspension load so that the slider is supported on a cushion of air. Airflow enters the leading edge of the slider and exits from the trailing end. The head normally resides toward the trailing end, which tends to fly closer to the recording surface than the leading edge.

Existing magnetic storage systems use magnetoresistive (MR) heads to read data from magnetic media and to uses inductive heads to write data onto magnetic media. MR disk drives use a rotatable disk with concentric data tracks containing the user data, a read/write head that may include an inductive write head and an MR read head for writing and reading data on the various tracks, a data readback and detection channel coupled to the MR head for processing the data magnetically recorded on the disk, an actuator connected to a carrier for the head for moving the head to the desired data track and maintaining it over the track centerline during read or write operations.

There is typically a plurality of disks stacked on a hub that is rotated by a disk drive spindle motor. A housing supports the drive motor and head actuator and surrounds the head and disk to provide a substantially sealed environment for the head-disk interface. The head carrier is typically an air-bearing slider that rides on a bearing of air above the disk surface when the disk is rotating at its operational speed. The slider is maintained in very close proximity to the disk surface by a suspension that connects the slider to the actuator. The spacing between the slider and the disk surface is called the flying height and its precise value is critical to the proper function of the reading and writing processes.

The inductive write head and MR read head are patterned on the trailing end of the slider, which is the portion of the slider that flies closest to the disk surface. The slider is either biased toward the disk surface by a small spring force from the suspension, and/or is "self-loaded" to the disk surface by means of a "negative-pressure" air-bearing surface on the slider.

The MR sensor detects magnetic field signals through the resistance changes of a magnetoresistive element, fabricated of a magnetic material, as a function of the strength and direction of magnetic flux being sensed by the element. MR sensors have application in magnetic recording systems because recorded data can be read from a magnetic medium when the external magnetic field from the recorded magnetic medium (the signal field) causes a change in the direction of magnetization in an MR read head. This in turn causes a change in electrical resistance in the MR read head and a corresponding change in the sensed current or voltage. The conventional MR sensor used in magnetic recording systems operates on the basis of the anisotropic magnetoresistive (AMR) effect in which a component of the element resistance varies as the square of the cosine of the angle between the magnetization in the element and the direction of sense or bias current flow through the element.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. The physical origin is the same in all types of GMR structures: the application of an external magnetic field causes a variation in the relative orientation of the magnetizations of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes. A particularly useful application of GMR is a sandwich structure comprising two essentially uncoupled ferromagnetic layers separated by a nonmagnetic metallic spacer layer in which the magnetization of one of the ferromagnetic layers is "pinned", and thus prevented from rotating in the presence of an external magnetic field. This type of MR sensor is called a "spin valve" sensor.

The read-write heads have been designed so that they will fly over the surface of the rotating disk at a very small, and relatively constant distance above the disk. The separation between the read-write head and the disk is called the flying height, and is maintained by a film of air. The flying height is critical to proper function during reading and writing. If the flying height is too high during read, the read head will not be able to resolve the fine detail of the magnetic signal, thereby resulting in undecipherable data. Similarly, if the flying height is too high during a write, the magnetic flux lines that intersect the plane of the disk surface become weaker, thereby leading to loss of resolution.

As magnetic recording areal density increases, the flying height between the head and the disk continues to shrink. As discrete data storage areas are placed more closely to one another, the transducer must be positioned more closely to the recording surface to distinguish between adjacent storage areas. In recent year, head flying heights have been decreased largely due to improved techniques for reducing media surface roughness. Further reductions in flying height are enabled by a super smooth polishing of media surfaces in data recording areas while also providing an adjacent head contact zone, textured to avoid stiction problems.

Flying height flying height control itself also has two distinct but related aspects: 1) achieving a desired low flying heightflying height during disk rotation and 2) keeping the flying heightflying height as close as possible to a constant during disk rotation. The first aspect relates to the capability to achieve a sustainable average low flying heightflying height while the second aspect relates to the stability of the flying height during disk rotation regardless of the average flying heightflying height. These two aspects are further explained as follows.

Increasingly higher areal density in disk drives requires that, in addition to having direct impact on radial positioning resolution, the flying heightflying height be decreased in order to obtain higher signal resolution. That is, there is a pressing need for the air-bearing surface of a slider to fly as close to the media as possible, without touching the media to produce better resolution of data on the media, because read/write signal amplitude is dependent on the distance between the magnetic medium and the read/write head, and close spacing drastically improves transducer performance without having to improve sensitivity of the transducer.

The schemes used in conventional hard drives to lower the flying height primarily address air bearing designs and smoothening of the disk surface. However, this approach is reaching the limit of its ability to meet the ever decreasing flying height requirement and the accompanying need to control disturbances present in the hard drive environment. Other various methods have been used for controlling transducer head flying height. For example, the head-media spacing loss due to thermal expansion of the transducer may be addressed by optimizing the thermal mechanical structure and properties of the transducer. Such a method is in essence a passive countermeasure and fails to actively adjust the pole tip position of the transducer to consistently minimize its impact on head-media spacing.

Also, a transducer is movable toward and away from the air bearing surface in response to changes in the slider operating temperature. The transducer movement is either due to a difference in thermal expansion coefficients between a transducing region of the slider incorporating the transducer and the remainder of the slider body, or by virtue of a strip of thermally expansive material incorporated into the slider near the transducer to contribute to the displacement by its own expansion.

In this regard, a flying height control device has been proposed that include a resistance heating element mounted to the slider body. The heating element is disposed within a transducing region substantially encapsulated in the slider body. The slider body and transducing region have different thermal expansion coefficients. Thus, the position of the transducer may be determined primarily by the differences in expansion, as the slider is heated. Alternatively, the heating element may be formed using a thermally expansive and electrically conductive material mounted to the slider body near the transducer. In this arrangement, the heating element provides a thermal expansion region with a higher thermal expansion coefficient than the slider body. The material thermally expands when subject to a bias current and elastically expands adjacent material, thus to play a direct role in determining transducer position.

In such slider designs, the main function of the heater is to heat the area to cause mechanical deformation altering the flying height of the slider. The degree of mechanical deformation and the time required to achieve the deformation depends on many factors, but the location of the heater with respect to the ABS surface is perhaps the most important one. Typically, the desired time constant is on the order of 100–200 μsec, which requires the heater to be placed near the ABS. However, as the heater is moved closer to the ABS surface, the heat generation from the heater also causes MR temperature to increase. This rise in the MR temperature can decrease the reliability of the MR head.

The fast response time (100–200 μsec), however, is only needed for what is called a first sector write. The time constant for the write head is on the order of 100–200 μsec. This means that when the write head begins to write, the magnetic spacing can acutally be higher for the first 100–200 μsec. Hence, during the initial 100–200 μsec, the data may not be written correctly since the magnetic spacing is too large. To overcome this problem, heater is used to heat the writer region to cause similar deformation immediately before writing takes place.

The heater is also used to compensate for the same deformation during reading, to offset the flying height sigmas, and to adjust for low temperature conditions. These three cases, however, does not requires such a fast time constant and thus the heater does not need to be close to the ABS surface. It can be placed sufficiently away from the ABS surface so that the temperature rise to the MR head is minimal.

Nevertheless, achievement of all of these objectives is difficult since the demands and requirements are different.

It can be seen then that there is a need for a method and apparatus for optimizing flying height control using heated sliders.

SUMMARY OF THE INVENTION

To overcome the limitations in the prior art described above, and to overcome other limitations that will become apparent upon reading and understanding the present specification, the present invention discloses a method and apparatus for optimizing flying height control using heated sliders.

The present invention solves the above-described problems by providing dual heaters that may selectively activated to meet operating characteristic of the slider.

A method for optimizing flying height control using heated sliders in accordance with the principles of the present invention includes providing a first heater in a slider for implementing a first operating characteristic, providing a second heater in a slider for implementing a second operating characteristic, providing a power source for activating the first and second heaters; and providing an activation controller for allowing the first and second heaters to be selectively activated by the power source.

In another embodiment of the present invention, a method of operation of a dual heater slider is provided. The method includes identifying a first need for activation of a first heater disposed in a slider, signaling a power source to provide an activation signal for activating the first heater for satisfying the identified first need and selectively providing the activation signal to the appropriate first heater.

In another embodiment of the present invention, a slider for a magnetic storage system is provided. The slider includes a slider body, a read head and a write head coupled to the slider body, a first heater disposed near the air bearing surface of the slider body and a second heater disposed away from the ABS surface.

In another embodiment of the present invention, a storage device is provided. The storage device includes a magnetic recording medium for recording data thereon, a slider having a read head and a write head coupled to the slider, a motor, coupled to the magnetic recording medium, for translating the magnetic recording medium and an actuator, coupled to the transducer, for translating the transducer relative to the magnetic recording medium, wherein the slider further comprises a first heater disposed near the air bearing surface of the slider and a second heater disposed away from the air bearing surface of the slider.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for optimizing flying height control using heated sliders. Selectively activated heaters are provided in a slider for implementing desired operating characteristics.

Figure 1:
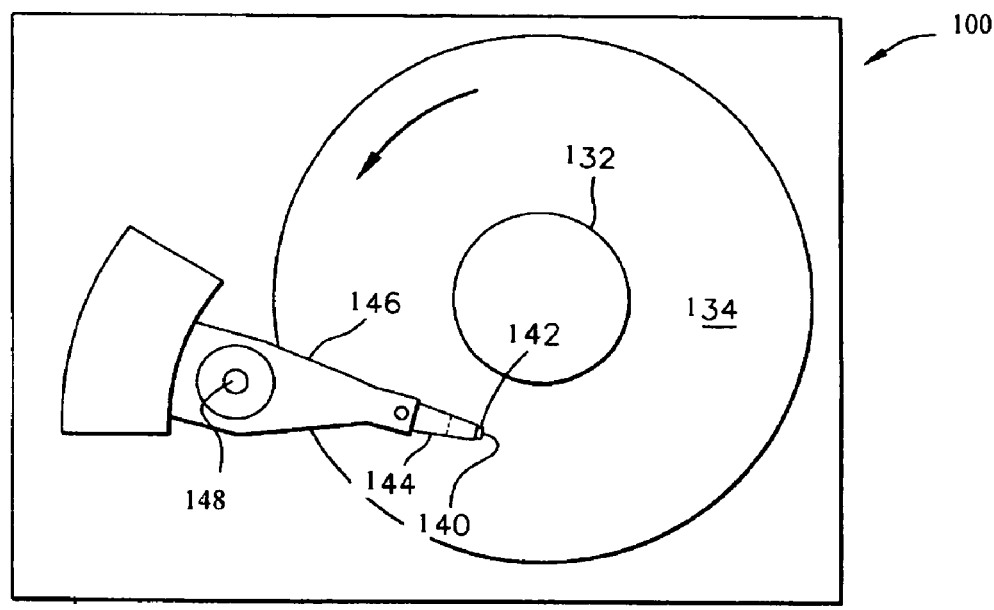
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
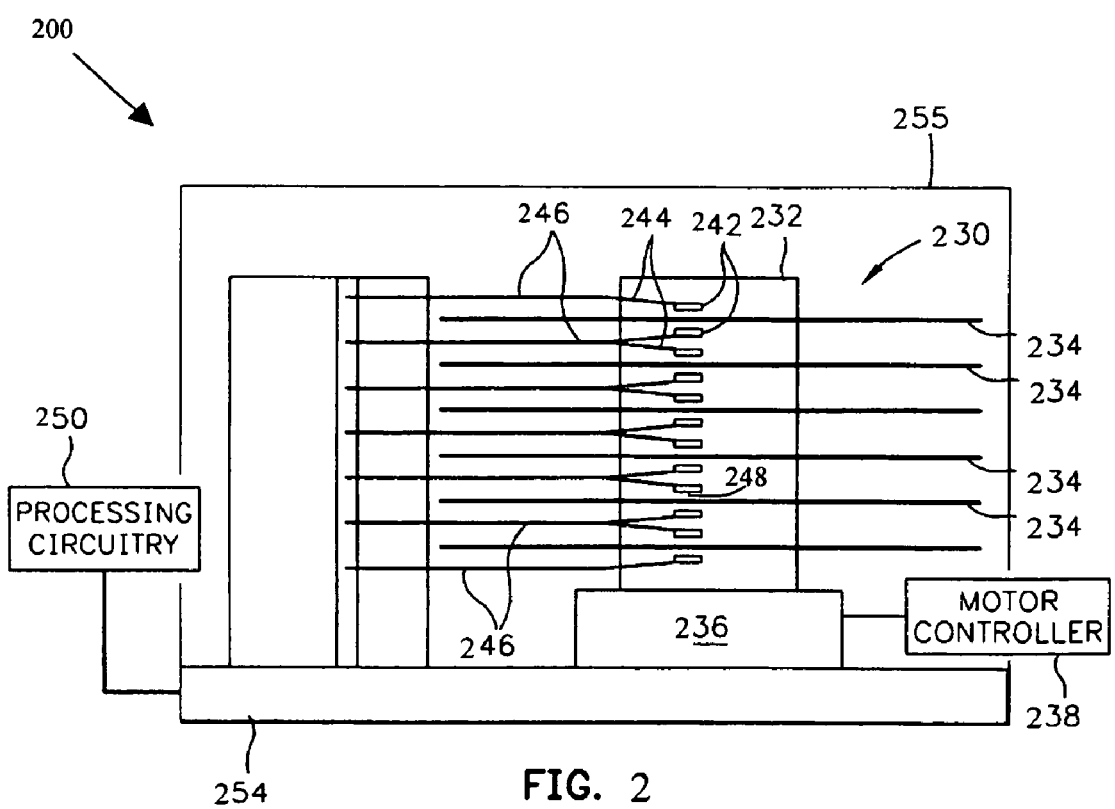
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air-bearing surface (ABS) 248. The magnetic head may then be employed for writing information to multiple circular tracks on the surface of the disk 234, as well as for reading information therefrom.

Figure 3:
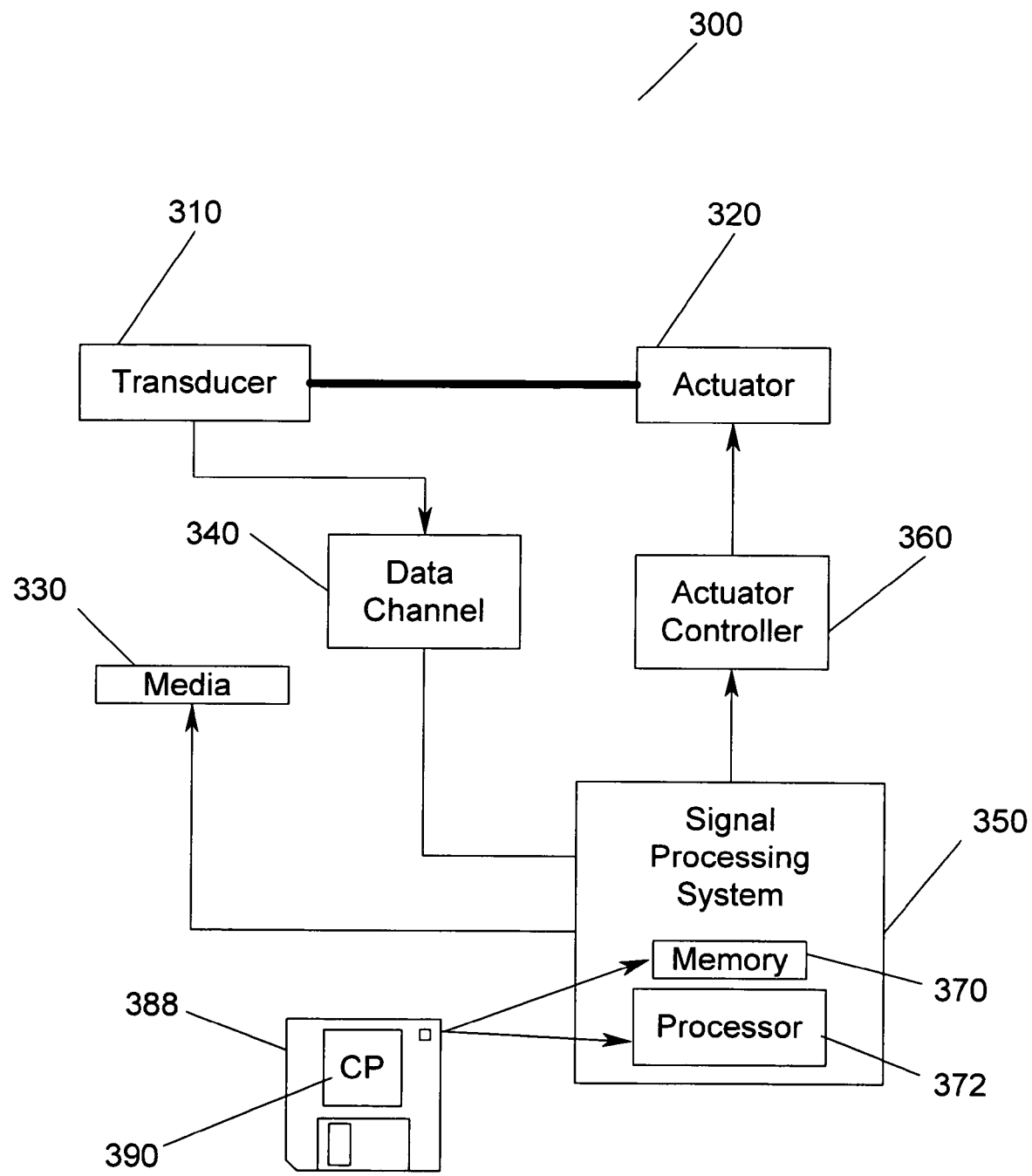
FIG. 3 illustrates a storage system according to the present invention.

FIG. 3 illustrates a storage system 300 that uses a MR sensor for sensing contact of the MR head with a recording medium based upon resistance changes in the MR element according to an embodiment of the present invention. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, an actuator controller 360 is controlled by the signal processor system 350 to cause the read/write transduer 330 to move relative to the magnetic media 310. Nevertheless, the present invention is not meant to be limited to a particular type of storage system 300 or to the type of media 330 used in the storage system 300.

Figure 4:
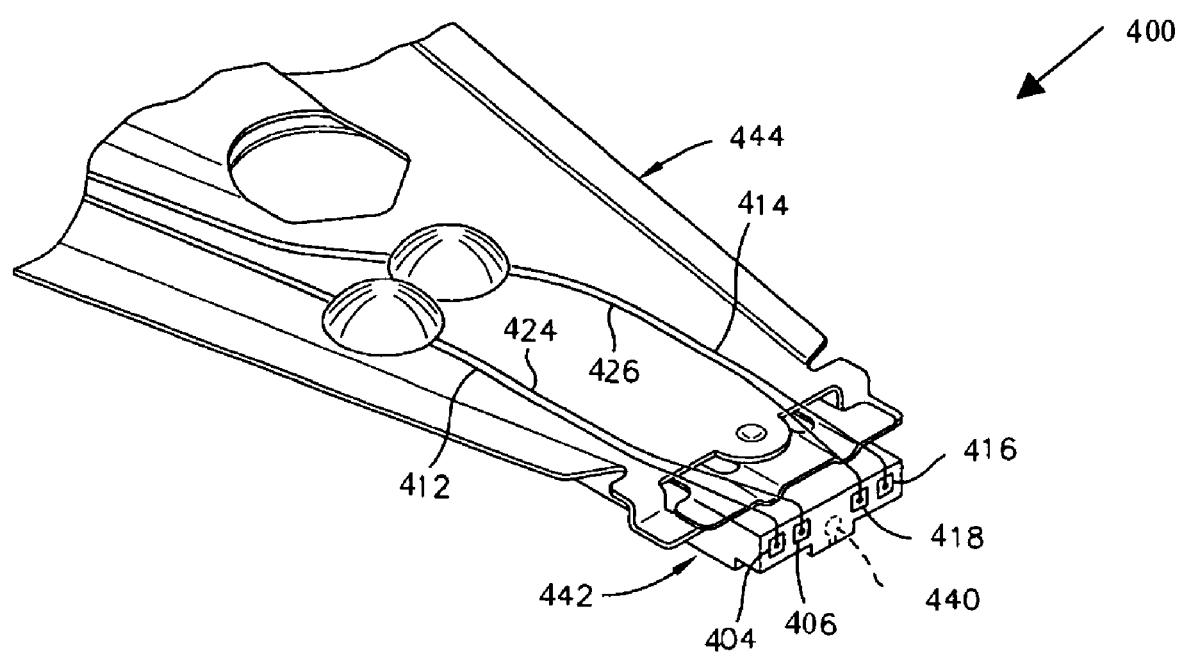
FIG. 4 is an isometric illustration of a suspension system for supporting a slider having a magnetic head mounted thereto.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 5:
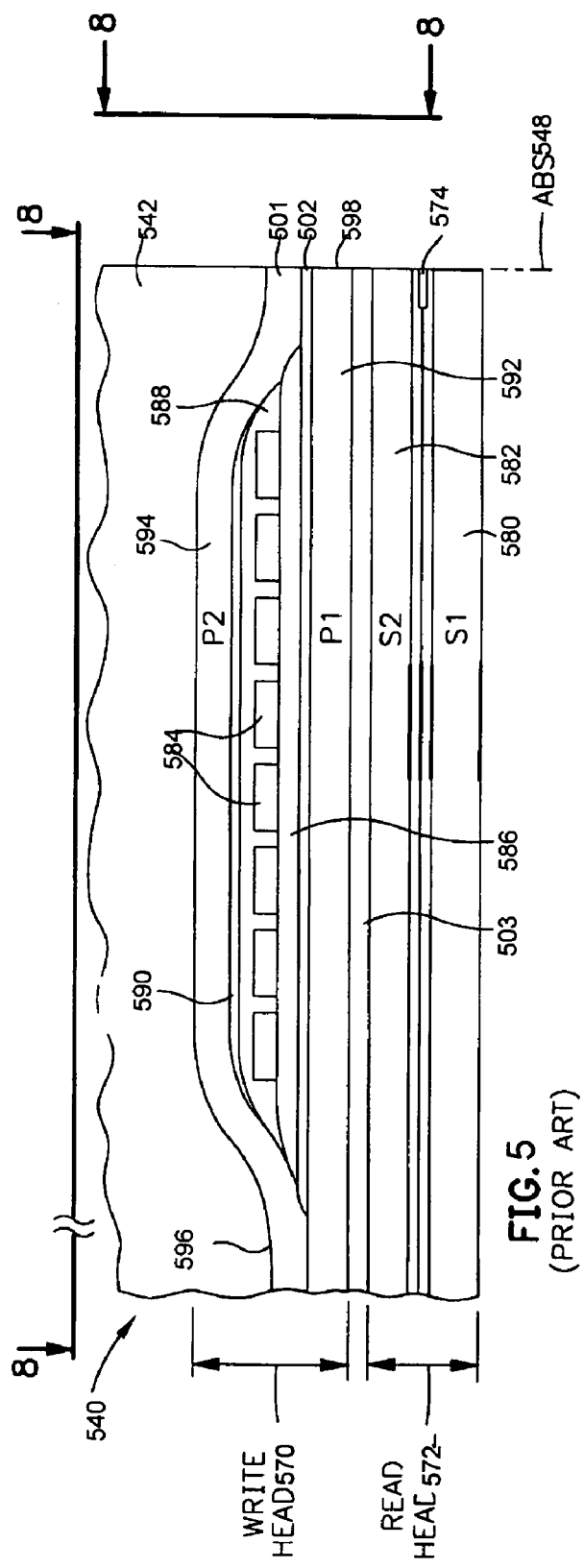
FIG. 5 is a side cross-sectional elevation view of a magnetic head.
Figure 6:
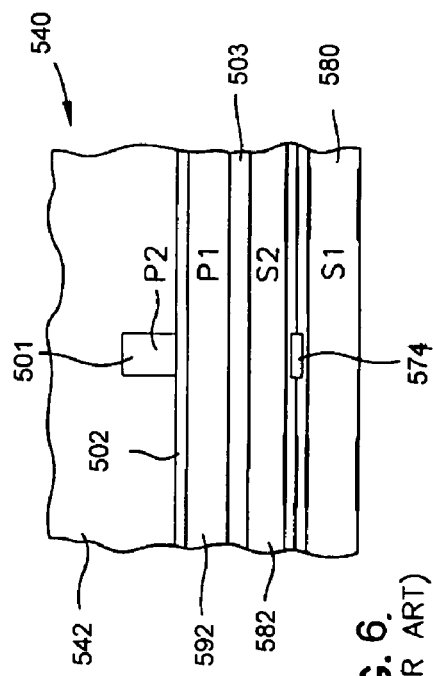
FIG. 6 is an air bearing surface (ABS) view of the magnetic head of FIG. 5.

FIG. 5 is a side cross-sectional elevation view of a magnetic head 540. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current $I_s$ conducted through the sensor causes these resistance changes to be manifested as voltage changes. Similarly, a voltage may be applied and change in the current may be sensed. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS. The first pole piece layer 592 is separated from the second shield layer 582 by an insulation layer 503.

Figure 7:
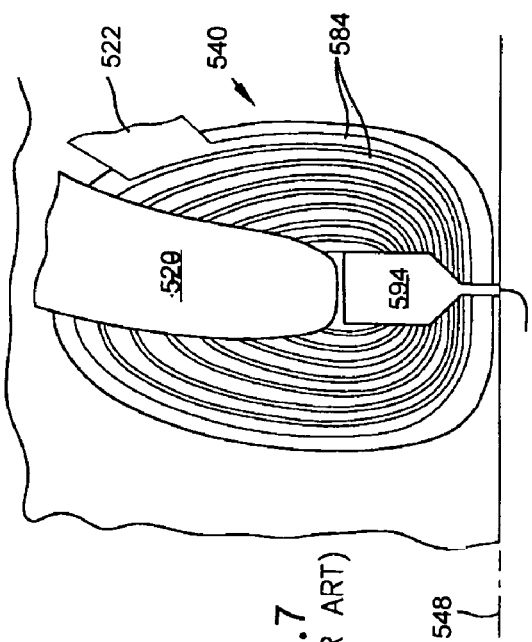
FIG. 7 illustrates the connect leads coupled to the coil for the write pole piece.

FIG. 7 illustrates a view of the connect leads 520, 522 coupled to the coil 584 for the write pole piece 594. As shown in FIGS. 4–7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

As described above, as flying heights that are targeted become smaller, it is critical to determine if unintentional contact between the head and disk occurs to maintain reliability of the head/disk interface. In addition, seek loss occurs in disk drives when servo is lost and the voice coil motor (VCM) seeks uncontrollably between the inner-diameter (ID) and the outer-diameter (OD) crash stop. Moreover, this seek loss may cause disk damage due to head/disk contacts.

The MR sensor is sensitive to temperature changes that occur due to friction during head/disk interaction. In fact, the resistance of the MR sensor is proportional to this temperature change. In accordance with an embodiment of the present invention, by using the MR sensor in the slider, head/disk contact inside the drive may be monitored without added cost or the use of additional equipment. Further, the resistance of the MR sensor may also be used to detect when the slider is on the ramp and therefore the storage device may then recover from such events.

Figure 8:
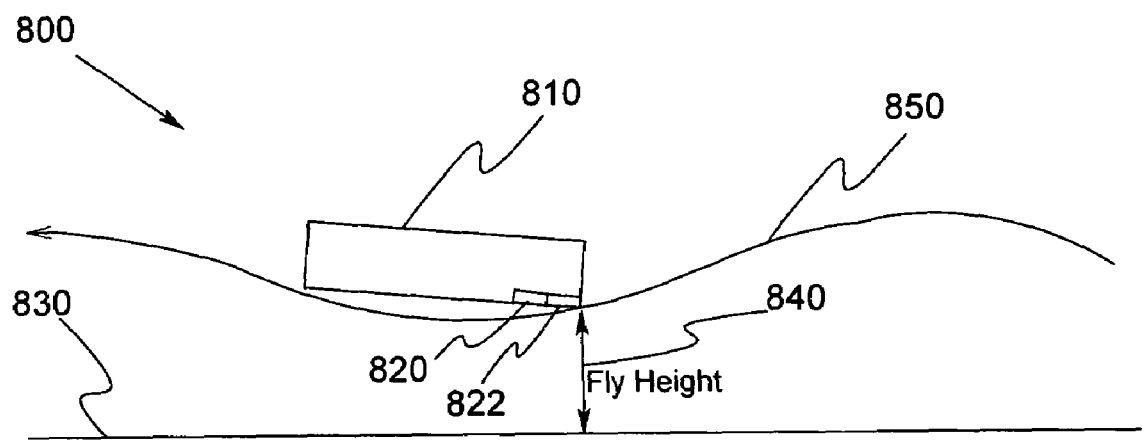
FIG. 8 is an illustration of flying height variations.

FIG. 8 is an illustration of flying height variations 800. In FIG. 8 a slider 810 having a read/write head 820, 822 is disposed above a magnetic recording medium 830. The distance the slider is separated from the magnetic recording medium is referred to as the flying height 840. The curved line 850 demonstrates the variation in flying height 840 of the slider 810. As the write head 8 822 begins to write data to the magnetic recording medium 830, the current flowing through the write coil heats the slider 810. As the temperature of the slider 810 begins to increase, the read/write element region of the slider 810 begins to fly closer to the magnetic recording medium 830. However, the first bits written to the magnetic recording medium 830 may not be written to the correct spot on the magnetic recording medium 830 because the flying height 840 is too high. Similarly, the flying height 840 may also vary during a read operation by the read head 820.

Another parameter that causes variations in flying height 840 is environmental temperature variations. Moreover, if the flying height 840 shown in FIG. 8 is collected for a group of heads, the statistical estimator of the variations in flying height 840 of the group of heads is the flying height sigma. This parameter is proportional to the standard deviation of other parameters that affect flying height 840, and to the sensitivities of the design of air bearing.

Figure 9:
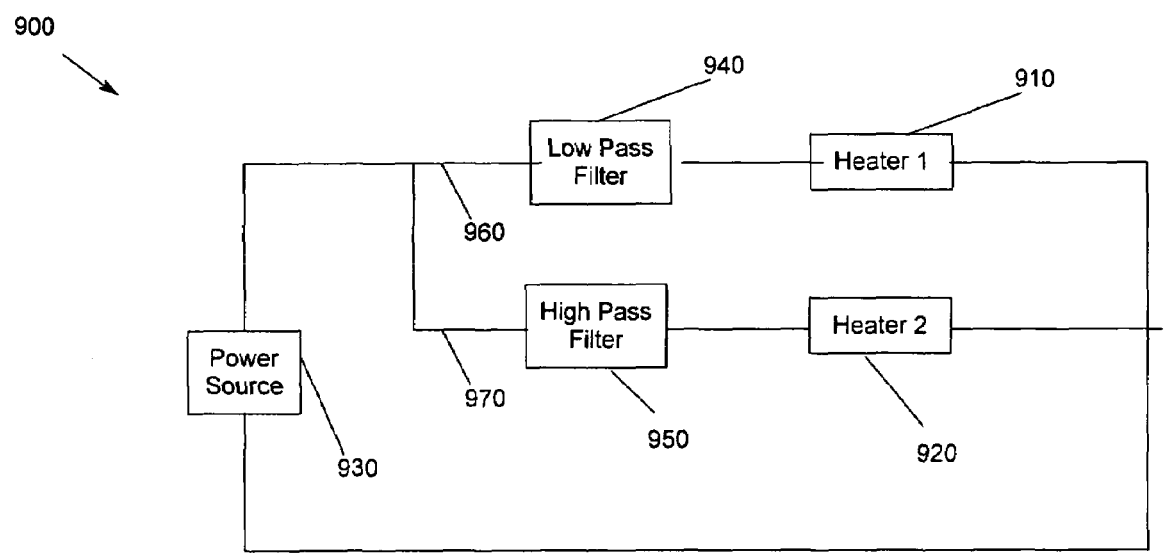
FIG. 9 illustrates a diagram of a slider heater system according to an embodiment of the present invention.

FIG. 9 illustrates a diagram 900 of a slider heater system according to an embodiment of the present invention. To provide flying height compensation for all four cases described above with respect to FIG. 7, two heaters 910, 920 are used. A first heater 910 is placed near the ABS to satisfy the fast response time requirement. The first heater 910 is only used for this purpose. The second heater 920 is placed further away from the ABS surface. The second heater 920 is used for read operations, to adjust for environmental temperature variations and to offset flying height sigmas and writing that does not require fast response of the thermal heating system. An AC power source 930 is used to operate the first 910 and second 920 heaters. The activation of the first 910 and second 920 heaters is controlled using two filters 940, 950. A low pass filter 940 and a high pass filter 950 may be used to selectively activate the first 910 and second 920 heaters. In this manner, the first 910 and second 920 heaters can be controlled using only two wires 960, 970 with the first 910 and second 920 heaters arranged in a parallel configuration.

Those skilled in the art will recognize that the low pass filter and high pass filter may be reversed without departing from the scope of the present invention. Those skilled in the art will also recognize that other means for selectively activating the first and second heaters may be used. For example, a DC power source can be used instead, wherein a diode scheme is configured to selectively activation the first and second heaters. Still further, 4 leads could be used to drive each of the first and second heaters independently. Moreover, three leads could be used where one is common and the other two leads are attached to two separate DC/AC power sources. Those skilled in the art will also recognize that while only two heaters are shown, two or more heaters may be implemented when two or more adjustments are warranted and the additional cost and complexity is justifiable.

Figure 10:
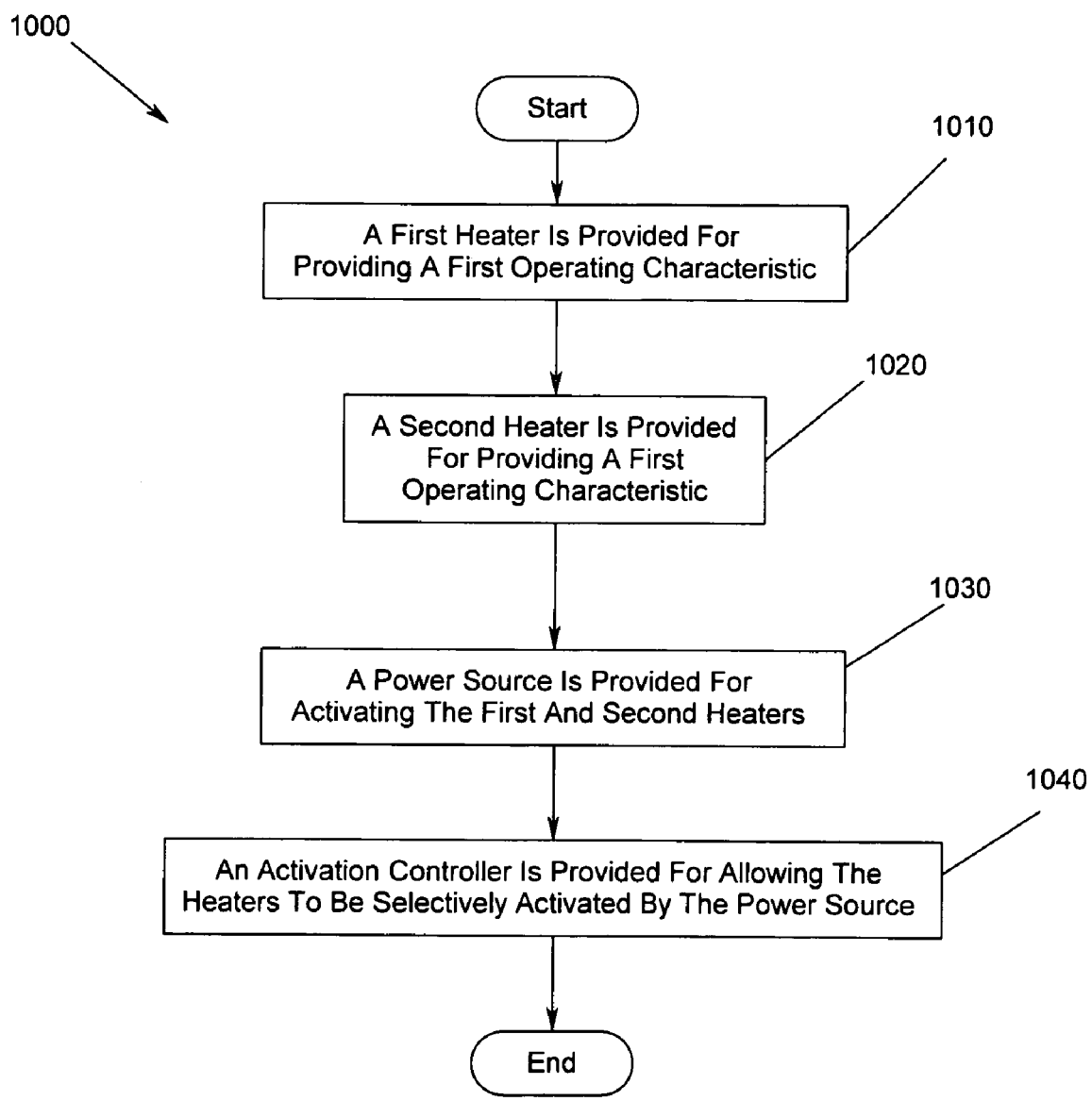
FIG. 10 is a flow chart of a method for optimizing flying height control using heated sliders according to an embodiment of the present invention.

FIG. 10 is a flow chart 1000 of a method for optimizing flying height control using heated sliders according to an embodiment of the present invention. In FIG. 10, a first heater is provided for providing a first operating characteristic 1010. A second heater is provided for providing a first operating characteristic 1020. For example, one heater may be disposed near the ABS to satisfy a fast response time requirement and another heater may be disposed further away from the ABS surface to adjust for environmental temperature variations, to offset flying height sigmas and for read operations as well as during writing. A power source is provided for activating the first and second heaters 1030. An activation controller is provided for allowing the heaters to be selectively activated by the power source 1040.

Figure 11:
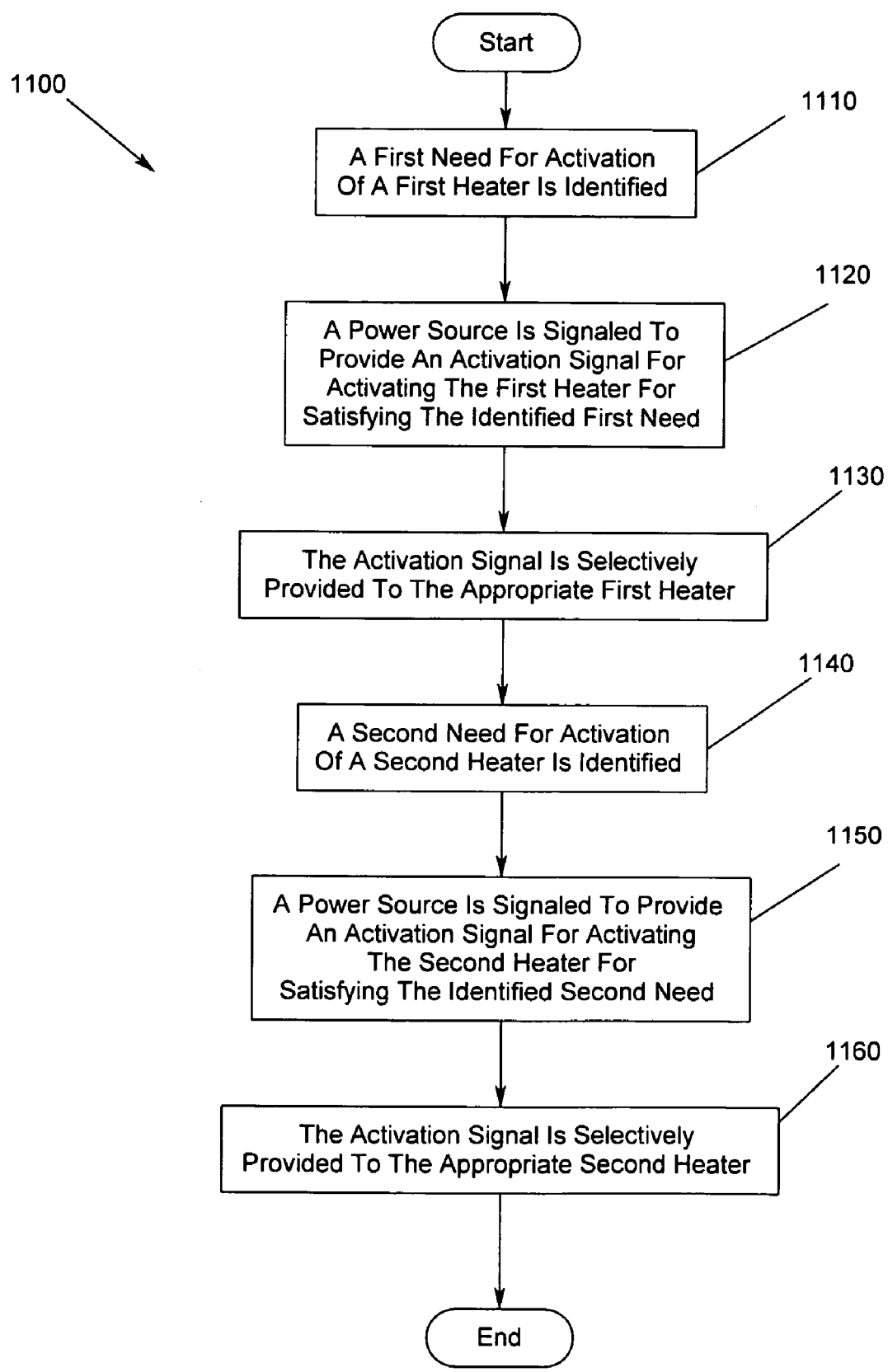
FIG. 11 is a flow chart of the method of operation of a dual heater slider according to an embodiment of the present invention.

FIG. 11 is a flow chart 1100 of the method of operation of a dual heater slider according to an embodiment of the present invention. In FIG. 11, a first need for activation of a first heater is identified 1110. A power source is signaled to provide an activation signal for activating the first heater for satisfying the identified first need 1120. The activation signal is selectively provided to the appropriate first heater 1130. A second need for activation of a second heater is identified 1140. A power source is signaled to provide an activation signal for activating the second heater for satisfying the identified second need 1150. The activation signal is selectively provided to the appropriate second heater 1160.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for optimizing flying height control using heated sliders, comprising:
   providing a first heater in a slider for implementing a first operating characteristic;
   providing a second heater in a slider for implementing a second operating characteristic;
   providing a power source for activating the first and second heaters; and
   providing an activation controller for allowing the first and second heaters to be selectively activated by the power source.

2. The method of claim 1, wherein providing a first heater further comprises providing a first heater disposed near the air bearing surface of the slider to satisfy a fast response time requirement.

3. The method of claim 1, wherein the providing a second heater further comprises providing a second heater disposed away from the air bearing surface of the slider to adjust for environmental temperature variations, to offset flying height sigmas and for read/write operations.

4. The method of claim 1, wherein providing an activation controller for allowing the first and second heaters to be selectively activated by the power source further comprises providing a low pass filter in series with the first heater and a high pass filter in series with the second heater.

5. The method of claim 4, wherein providing a power source for activating the first and second heaters further comprises providing an AC power source for generating a low frequency when activating the first heater and a high frequency when activating the second heater.

6. The method of claim 4, wherein providing the first and second heaters comprises coupling the first and second heaters in parallel.

7. The method of claim 1, wherein providing the first and second heaters comprises providing separate, independent signal paths to the first and second heaters.

8. The method of claim 1, wherein providing the first and second heaters comprises coupling the first and second heaters in parallel.

9. The method of claim 1, wherein providing a power source for activating the first and second heaters further comprises providing a DC power source and wherein the providing an activation controller for allowing the first and second heaters to be selectively activated by the power source further comprise providing a DC power selection scheme.

10. A method of operation of a dual heater slider, comprising:
    identifying a first need for activation of a first heater disposed in a slider;
    signaling a power source to provide an activation signal for activating the first heater for satisfying the identified first need;
    selectively providing the activation signal to the appropriate first heater;
    identifying a second need for activation of a second heater disposed in the slider;
    signaling a power source to provide an activation signal for activating the second heater for satisfying the identified second need; and
    selectively providing the activation signal to the appropriate second heater.

11. A slider for a magnetic storage system, comprising:
    a slider body;
    a read head and a write head coupled to the slider body;
    a first heater disposed near the air bearing surface of the slider body; and
    a second heater disposed away from the ABS surface.

12. The slider of claim 11, wherein the first heater is disposed near the air bearing surface of the slider body to satisfy a fast response time requirement.

13. The slider of claim 11, wherein the second heater is disposed away from the air bearing surface of the slider body to adjust for environmental temperature variations, to offset flying height sigmas and for read operations.

14. A storage device, comprising:
    a magnetic recording medium for recording data thereon;
    a slider having a read head and a write head coupled to the slider;
    a motor, coupled to the magnetic recording medium, for translating the magnetic recording medium; and
    an actuator, coupled to the transducer, for translating the transducer relative to the magnetic recording medium;
    wherein the slider further comprises a first heater disposed near the air bearing surface of the slider and a second heater disposed away from the air bearing surface of the slider.

15. The storage device of claim 14, wherein the first heater is disposed near the air bearing surface of the slider body to satisfy a fast response time requirement.

16. The storage device of claim 14, wherein the second heater is disposed away from the air bearing surface of the slider body to adjust for environmental temperature variations, to offset flying height sigmas and for read operations.

17. The storage device of claim 14 further comprises a low pass filter in series with the first heater and a high pass filter in series with the second heater.

18. The storage device of claim 17 further comprises an AC power source for generating a low frequency when activating the first heater and a high frequency when activating the second heater.

19. The storage device of claim 17, wherein the first and second heater are coupled in parallel.

20. The storage device of claim 17 wherein the first and second heaters are coupled using separate, independent signal paths to the first and second heaters.

21. The storage device of claim 17 further comprises a DC power source and a DC power selection scheme for selectively routing activation signals to the first and second heaters.

* * * * *